United States Patent
Laakso et al.

(10) Patent No.: US 7,027,829 B1
(45) Date of Patent: Apr. 11, 2006

(54) TRANSMISSION POWER CONTROL IN A RADIO COMMUNICATION SYSTEM

(75) Inventors: Janne Laakso, Helsinki (FI); Jari Sahinoja, Espoo (FI); Harri Holma, Helsinki (FI)

(73) Assignee: Nokia Corporation, Espoo (FI)

( * ) Notice: Subject to any disclaimer, the term of this patent is extended or adjusted under 35 U.S.C. 154(b) by 312 days.

(21) Appl. No.: 10/088,458

(22) PCT Filed: Sep. 14, 2000

(86) PCT No.: PCT/EP00/09105

§ 371 (c)(1),
(2), (4) Date: Sep. 4, 2002

(87) PCT Pub. No.: WO01/20806

PCT Pub. Date: Mar. 22, 2001

(30) Foreign Application Priority Data

Sep. 16, 1999 (GB) .................... 9921989

(51) Int. Cl.
*H04M 1/00* (2006.01)
(52) U.S. Cl. .............. 455/522; 455/517; 455/507; 455/500; 455/69; 455/68; 370/342; 370/335
(58) Field of Classification Search ............... 455/522, 455/67.3, 69, 123, 33.1, 69.1, 517, 67.11, 455/67.13, 507, 500, 68; 375/358, 205; 370/342, 370/335
See application file for complete search history.

(56) References Cited

U.S. PATENT DOCUMENTS

| | | | | |
|---|---|---|---|---|
| 5,333,175 A | * | 7/1994 | Ariyavisitakul et al. ..... | 455/423 |
| 5,455,967 A | * | 10/1995 | Amezawa et al. ............ | 455/69 |
| 5,590,409 A | * | 12/1996 | Sawahashi et al. ........... | 455/69 |
| 5,727,033 A | * | 3/1998 | Weaver et al. .............. | 375/358 |
| 5,774,785 A | | 6/1998 | Karlsson ..................... | 455/522 |
| 5,924,043 A | | 7/1999 | Takano ........................ | 455/522 |
| 5,931,964 A | * | 8/1999 | Beming et al. ............. | 714/748 |
| 6,334,058 B1 | | 12/2001 | Nystrom et al. ............ | 455/453 |
| 6,411,799 B1 | * | 6/2002 | Padovani ..................... | 455/69 |
| 6,430,398 B1 | * | 8/2002 | Blanc ........................ | 455/67.13 |
| 6,532,357 B1 | * | 3/2003 | Ichikawa .................... | 455/126 |
| 6,546,260 B1 | * | 4/2003 | Esmailzadeh et al. ...... | 455/522 |
| 6,748,232 B1 | * | 6/2004 | Anderson et al. ........... | 455/522 |
| 6,829,226 B1 | * | 12/2004 | Apostolides et al. ....... | 370/318 |
| 2002/0136357 A1 | * | 9/2002 | Suonsivu et al. .......... | 379/1.04 |
| 2003/0130004 A1 | * | 7/2003 | Esmailzadeh et al. ...... | 455/522 |

FOREIGN PATENT DOCUMENTS

| | | |
|---|---|---|
| EP | 0936753 | 8/1999 |
| WO | WO 99 41850 | 8/1999 |
| WO | WO 00/45528 | 8/2000 |

* cited by examiner

*Primary Examiner*—Sonny Trinh
*Assistant Examiner*—Khai Nguyen
(74) *Attorney, Agent, or Firm*—Cohen, Pontani, Lieberman & Pavane

(57) ABSTRACT

The present invention relates to a method in a communication system. The system comprises a controller arranged to control transmission power of stations, a first station and a second station, the controller being arranged to provide the first station with a target for use in control of the transmission power of the second station, monitoring means, and means for preventing use of a target for the transmission parameter that exceeds a limit value. The controller provides the first station with the target and the first station adjusts the transmission power of the second station on basis of the target. A predefined condition is monitored, and upon occurrence of the predefined condition, use of a target for the transmission parameter exceeding a limit value for the target for the transmission parameter is prevented.

33 Claims, 8 Drawing Sheets

TABLE 1

| RNC A | Iub Command | BS1/BS2 A1/A2 | BS2 B2 | BS1 B1 | BS1 DriftB1<>A1 |
|---|---|---|---|---|---|
| 4.1dB | | 4.1db | 4.1db | 4.1db | 0.0db |
| Normal functionality | | | | | |
| 4.0 | StepDown | 4.0 | 4.0 | 4.0 | 0.0 |
| 4.5 | StepUp | 4.5 | 4.5 | 4.5 | 0.0 |
| Cell 1 is overloaded, OLPC/BS1 OFF | | | | | |
| 5.0 | StepUP | 5 | 5 | 4.5 | +0.5 |
| 4.9 | StepDown | 4.9 | 4.9 | 4.4 | +0.5 |
| Indication to RNC OLPC/RNC OFF | | | | | |
| 4.8 | Stepdown | 4.8 | 4.3 | 4.3 | +0.5 |
| Cell1 is in normal load, OLPC/BS1 ON | | | | | |
| 4.7 | StepDown | 4.7 | 4.7 | 4.3 | +0.4 |
| 4.6 | StepDown | 4.6 | 4.6 | 4.3 | +0.3 |
| 4.5 | StepDown | 4.5 | 4.5 | 4.3 | +0.2 |
| RNC notices that cell 1 is not overloaded OLPC/RNC ON | | | | | |
| 5.0 | StepUP | 5.0 | 5.0 | 4.8 | +0.2 |
| 4.9 | StepDown | 4.9 | 4.9 | 4.8 | +0.1 |
| 4.8 | StepDown | 4.8 | 4.8 | 4.8 | 0.0 |
| 4.7 | stepDown | 4.7 | 4.7 | 4.7 | 0.0 |

FIG. 5

TABLE 2

| RNC A | Iub Command | BS1/BS2 A1/A2 | BS2 B2 | BS1 B1 | BS1 DriftB1<>A1 |
|---|---|---|---|---|---|
| 4.1 dB (=EbNo1) | | 4.1db | 4.1db | 4.1db | 0.0db |
| Normal functionality | | | | | |
| 4.0 | StepDown | 4.0 | 4.0 | 4.0 | 0.0 |
| 4.5 | StepUp | 4.5 | 4.5 | 4.5 | 0.0 |
| Cell 1 is overloaded, OLPC/BS1 OFF | | | | | |
| 5.0 | StepUP | 5 | 5 | 4.5 | +0.5 |
| 5.5 | StepUP | 5.5 | 5.5 | 4.5 | +1.0 |
| Indication to RNC OLPC/RNC OFF | | | | | |
| 5.4 | Stepdown | 5.4 | 5.4 | 4.4 | +1.0 |
| Cell1 is in normal load, OLPC/BS1 ON | | | | | |
| 5.3 | StepDown | 5.3 | 5.3 | 4.4 | +1.0 |
| 5.2 | StepDown | 5.2 | 5.2 | 4.4 | +0.9 |
| 5.1 (=EbNo1) | StepDown | 5.1 | 5.1 | 4.4 | +0.8 |
| RNC notices that cell 1 is not overloaded OLPC/RNC ON | | | | | |
| 4.9 (-0.2) | StepDown | 4.9 | 4.9 | 4.4 | +0.5 |
| 4.7 (-0.2) | StepDown | 4.7 | 4.7 | 4.4 | +0.3 |
| 4.5 (-0.2) | StepDown | 4.5 | 4.5 | 4.4 | +0.1 |
| 4.3 (-0.2) | StepDown | 4.3 | 4.3 | 4.3 | No drift between BS and RNC EbNo's |
| 4.1 (-0.2) (=EbNo1,the RNC-drift=0) | StepDown | 4.1 | 4.1 | 4.1 | |

FIG. 6

TRANSMISSION POWER CONTROL IN A RADIO COMMUNICATION SYSTEM

FIELD OF THE INVENTION

PRIORITY CLAIM

This is a national stage of PCT application No. PCT/EP00/09105, filed on Sep. 14, 2000. Priority is claimed on that application, and on patent application No. 9921989.1 filed in Great Britain on Sep. 16, 1999.

The present invention relates to power control in a communication system, and in particular, but not exclusively, to power control of a station of the communication system in a power limitation situation.

BACKGROUND OF THE INVENTION

In a mobile telecommunication system, such as CDMA (Code Division Multiple Access) or WCDMA (Wide-band CDMA) or TDMA (Time division Multiple Access) system, transmission power levels between a base (transceiver) station (BS) and a mobile station (MS) associated with said base station can be continuously adjusted during an ongoing connection between the base station and the mobile station. This is done in order to provide a sufficient quality for the transmission in various conditions. To reduce power consumption and interference it is also preferred to keep the required transmission power levels as low as possible at the same time. By means of this it is possible to avoid "wasting" any network resources and power resources, and to enable as great a number of mobile stations as possible to communicate simultaneously with the base station having only limited power resources. The power resources of the base station are limited both in transmission (downlink) and receiving (uplink) directions.

In the uplink the limitation means that a base station cannot receive and process more than a predefined number of connections from mobile stations. The uplink direction can be limited by increased quality requirements, e.g. in a situation in which a great number of mobile stations is communicating via the base station and request for a higher transmission quality. If the power levels are increased in the cell in order to improve the quality, this increases interference in the uplink. Therefore, in addition to the incapability of the base station to receive more than a limited amount of transmission power from the mobile stations, too high transmission powers from the mobile stations may cause too high interference to the radio traffic within the cell and/or have an adverse influence to the overall performance of the base station.

One power control mechanism is based on power control (PC) commands transmitted between two stations to cause the other station to alter or adjust or change its transmission power. The PC commands can be transmitted e.g. in a WCDMA closed loop functioning between the BS and the MS. The closed loop PC (CLPC) commands can be sent both in the uplink (towards the base station) and in the downlink (towards the mobile station), whereafter the BS or the MS will process the received command and reduce/increase its transmission power towards the receiving station accordingly.

The power control between the stations, such as the closed loop PC, can be controlled by another power control command generated by a controller of the communication system. For example, in the currently proposed WCDMA system it is envisaged that an outer loop power control (OLPC) command generated by a radio network controller (RNC) of the WCDMA system will attempt to set the connection quality target of a physical connection between the BS and MS to be such that a required FER (Frame Error Ratio) target or BER (Bit Error Ratio) target or any other similar target of the connection is met with a minimal connection quality target. The closed loop power control command is then adjusted at the base station in accordance with the outer loop power control command received from the controller. The connection quality target may sometimes be referred to as a connection setpoint.

The connection quality target or setpoint can be announced e.g. by means of so called Eb/No (Signalling Energy/Noise) target or SIR (Signal to Interference Ratio) target or desired signal level target or a similar parameter indicating a quality measure which can be estimated for the connection. The relationship is such that the connection quality target (e.g. the SIR target) has to be set such that the FER or the BER or similar parameter of the connection remains at an appropriate level. The actual connection quality value (e.g. SIR) is then controlled in accordance with the target value, and one or several of used connection parameters having influence to the quality of the connection should follow any changes in the target value. In most cases it is sufficient if the transmission power is increased/decreased in order to meet the target value. The idea behind the arrangement is that by increasing the connection quality target value the transmission power (or any other appropriate transmission parameter having an influence over the connection quality) will increase and thus the connection quality will increase and the FER will improve.

However, if the appropriate target of the connection quality cannot be met due to e.g. a power limitation situation the connection quality target will start increasing, even though this rise in the connection quality target will not help in causing a better connection between the MS and the BS. The power limitation condition at the BS can be caused e.g. by an overload situation or a failure. If the power limitation is only temporary the quality target will also be unnecessarily high once this condition has been removed. The temporary power limitation can occur e.g. when too many mobile stations are trying to become connected to one BS, e.g. when a bus or train with several mobile users suddenly enters the radio coverage area of the base station. The power limitation may also occur e.g. when the radio connection between the BS and one or several mobile stations weakens temporarily, for instance, the MS enters temporarily a tunnel or cellar, which will cause a rapid rise in the transmission powers. The failures causing a power limitation situation may occur in the base station, elsewhere in the communication system or in the mobile stations. The power limitation situation may result in an excessively high power levels within the cell until the quality target has returned to its normal (nominal) level. In addition, an uncontrolled power limitation situation (i.e. the powers of the mobile stations may rise freely) will lead to a situation in which the mobile stations positioned in the edge area of the cell start loose the connection i.e. the mobile stations "drop" from the cell. This leads to a decrease in the size of the cell.

Earlier proposals to solve the problems caused by the power limitation situation have been based on setting absolute limits on the values of the SIR targets. However, the absolute limits have to be relatively loose due to the variations in the required quality target for satisfactory quality of the communication. There has not been any efficient means for rapidly preventing an excessive increase of the target or setpoint value in an overload or other sudden power limitation situation. Instead, the target value has increased further as the target is increased accordingly despite the fact that no more power is available or can be received. In addition, when the power limitation situation is over, the recovery from the increased and unnecessarily high target values may take some time.

SUMMARY OF THE INVENTION

The embodiments of the present invention aim to address one or several of the above problems.

According to one aspect of the present invention, there is provided a method in a communication system, said system comprising a controller and a first station for communication with a second station with variable transmission power over a radio connection, wherein the controller provides the first station with a target for a transmission parameter of the radio connection and the first station adjusts the transmission power of the second station on basis of the target, comprising: monitoring for a predefined condition; upon occurrence of the predefined condition, preventing use of a target for the transmission parameter exceeding a limit value for the target for the transmission parameter.

According to a more specific embodiment the use of a target for the transmission parameter exceeding the limit value is prevented at the first station. The use of a target for the transmission parameter exceeding the limit value can also be prevented at the controller. The limit value may equal with the target for the transmission parameter in use at the moment of detecting the predefined condition. The predefined condition may comprise a temporary power limitation situation at the first station, an overload situation at the first station or a failure in the communication system. The monitoring of the occurrence of the predefined condition can be based on determination of the interference power of the radio connection.

According to a further embodiment a difference between the value of the target for the transmission parameter provided by the controller and the value of the target for the transmission parameter used for power control by the first station is detected after the predefined condition is over, whereafter the difference between the said two target values is reduced. The difference can be reduced based on history information of the target used for the power control prior the detection of the condition. The difference between the said two target values can be reduced gradually.

According to another aspect of the present invention there is provided a communication system, comprising: a controller arranged to control transmission power of stations; a first station and a second station capable of providing a communication path therebetween, wherein the controller is arranged to provide the first station with a target for use in control of the transmission power of the second station; monitoring means for monitoring for a predefined condition; and means for preventing use of a target for the transmission parameter exceeding a limit value for the target for the transmission parameter upon occurrence of the predefined condition.

The communication system may comprise further detecting means for detecting a difference between the target and the further target and recovery means for reducing the difference after the predefined condition is over.

According to a still another aspect of the present invention there is provided a station of a communication system, said station controlling transmission power of a further station transmitting towards the station, wherein the station is arranged to: receive a target for a transmission parameter provided by a controller of the communications system for use in the control of transmission power of the further station; monitor for a predefined condition; and upon occurrence of the predefined condition, to prevent use of targets for the transmission parameter exceeding a limit value for the target for the transmission parameter.

The embodiments of the invention provide several advantages. Should a power limitation situation occur, the embodiments prevent the situation getting even worse by preventing a unnecessary rise of the connection quality target or similar parameter influencing the transmission power in the cell. The powers in the cell may be limited in a level that still can be handled by the base station. The embodiments may also prevent an increase in the interference in the cell. Since the embodiments enable power resource situation within the cell to remain stable, it is possible to prevent disconnection of the ongoing connections, or to limit the disconnecting procedures to the connections having a lowest priority. In addition, the embodiments provide a fast response to a power limitation situation without any excessive delays due to e.g. signalling between a base station and a network controller or several controllers. In addition, the specific embodiments provide a controlled and "smooth" recovery procedure after the power limitation situation has ended.

BRIEF DESCRIPTION OF DRAWINGS

For better understanding of the present invention, reference will now be made by way of example to the accompanying drawings in which:

FIG. 5 is a table presenting an example of the operation of the present invention at the transceiver of the communication system;

FIG. 6 is a table presenting an example of the operation of the present invention at the controller of the communication system;

DESCRIPTION OF PREFERRED
EMBODIMENTS OF THE INVENTION

Figure 1:
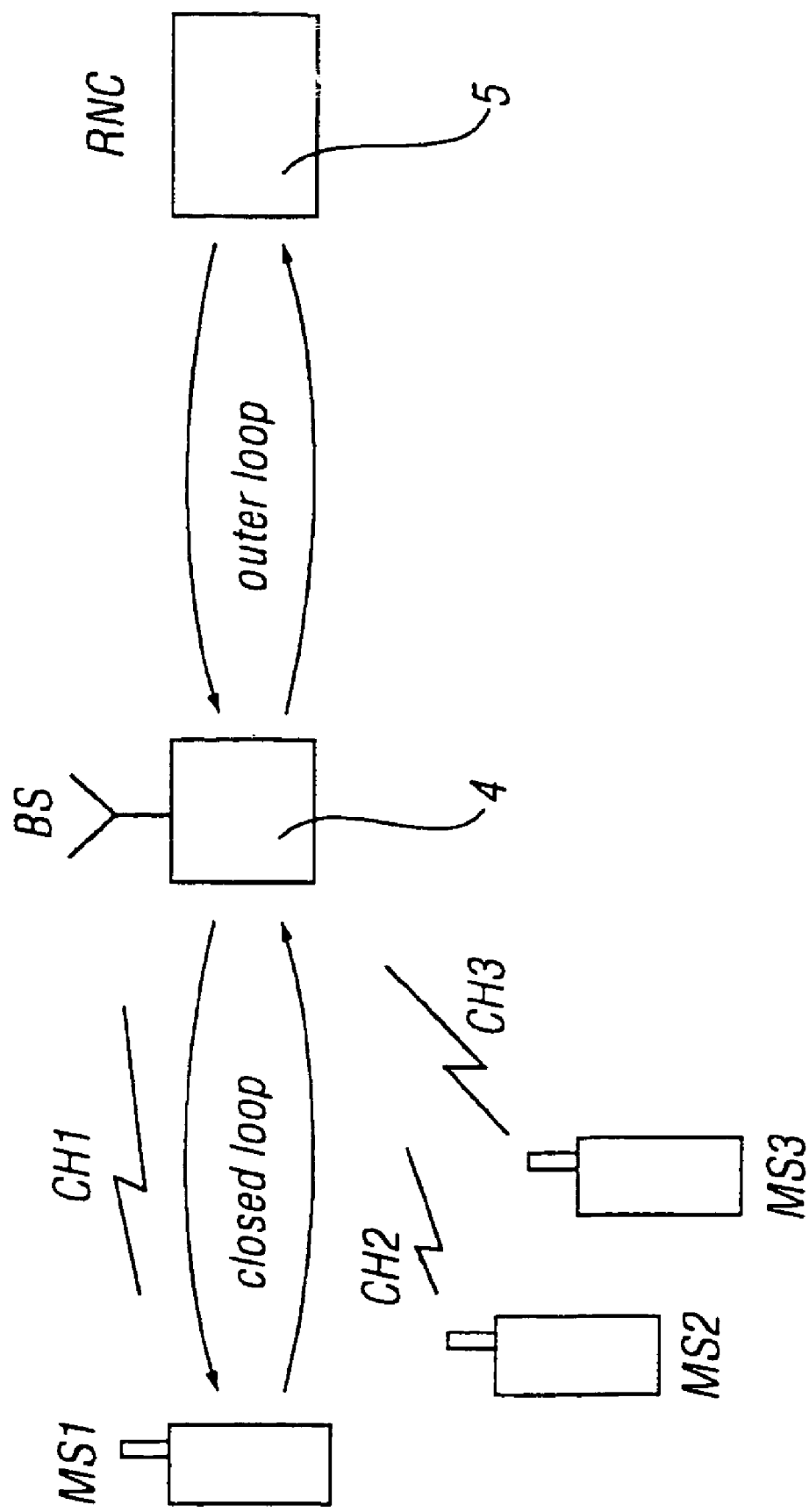
FIG. 1 shows schematically a part of a communication system in which the invention can be implemented.

FIG. 1 is a block diagram illustrating a context in which the present invention may be used. That is, a WCDMA system (Wideband CDMA) mobile communication system allows a plurality of mobile stations MS1, MS2, MS3 to communicate with a base transceiver station (BS) 4 in a common cell over a radio interface via respective channels CH1, CH2, CH3. The base station can sometimes be referred to as node B. In the CDMA based systems these channels are distinguished from one another by the use of scrambling codes in a manner which is know per se. Communication between the mobile stations 1–3 and the base station 4 may comprise any kind of data such as speech data, video data or other data. The power control commands between the mobile stations and the base station are handled by a closed loop power control mechanism.

The base station 4 is controlled by a controller 5 of the communication system. In the CDMA terminology this controller is often referred to as a radio network controller (RNC). The general arrangement is such that while the base station 4 controls the individual mobile stations 1–3 in its radio coverage area via the radio channels, the network controller 5 functions as a "central" controller controlling several base stations. The mobile stations 1–3 can be controlled by the controller 5 through the base station 4.

In the currently proposed WCDMA system the base station 4 receives appropriate control commands from the controller 5 via an outer loop (OL) power control (PC) mechanism. As response to the received commands the base station 4 proceeds accordingly to control the connections with individual mobile stations 1–3 via the closed loop (CL) between the respective mobile station and the base station. According to one possibility the commands may be transmitted in the closed loop in the frequency of 1.5 kHz, and in the outer loop in the frequency of about 10 to 100 Hz. However, it is noted that any other frequencies may be used here. The following description of the embodiments will concentrate in more detail on the outer loop power control (OLPC) mechanism between the base transceiver station 4 and the controller 5.

Figure 2:
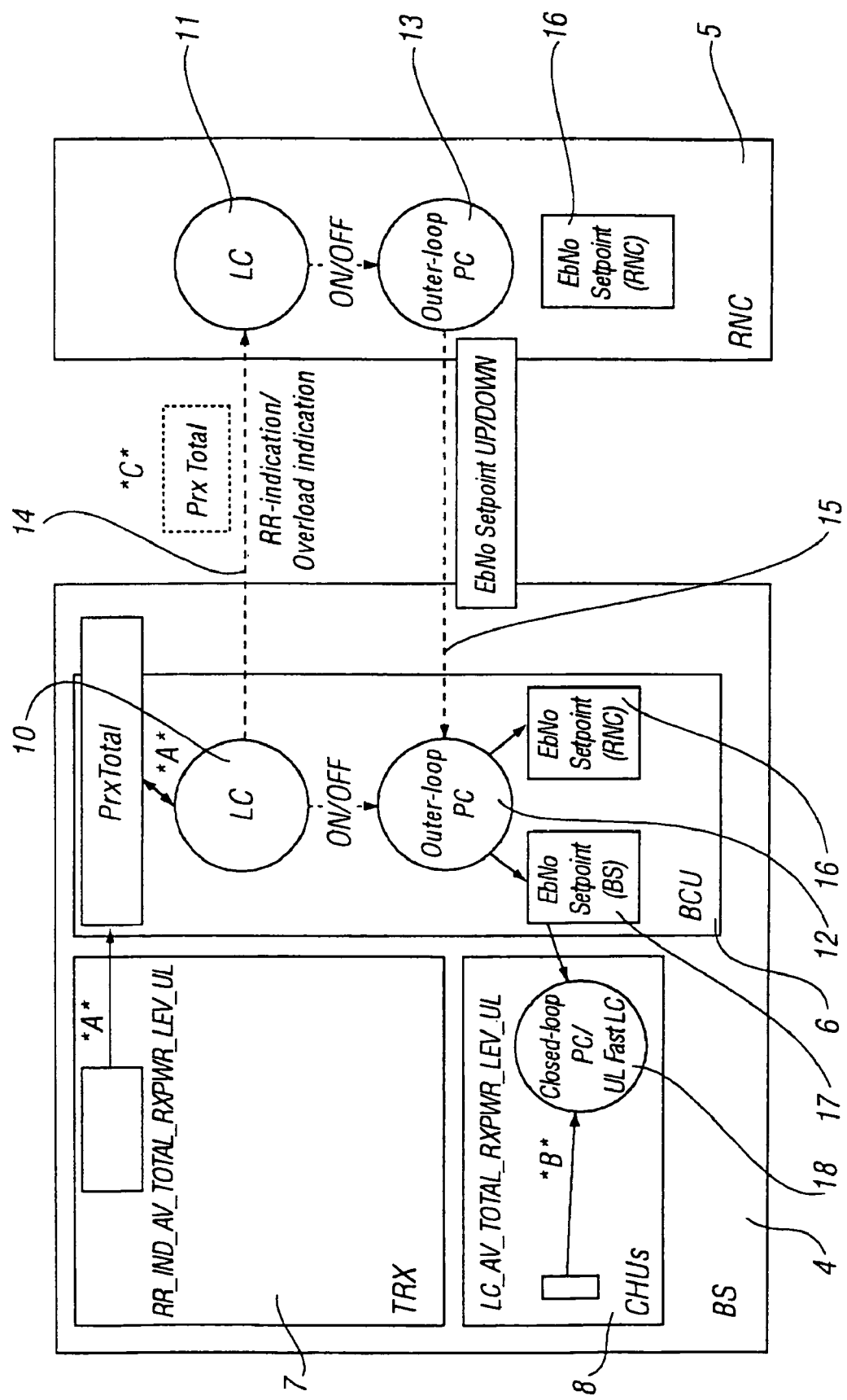
FIG. 2 is a block diagram of the base station and the controller of the communication system of FIG. 1.

FIG. 2 shows in more detail a base station 4 and a radio network controller 5 interacting with each other. The base station 4 of FIG. 2 includes a base station control unit (BCU) 6, a transmission power estimation unit (TRX) 7 and a radio channel unit (CHU) 8. The functionalities provided by the respective units as well as the controller 5 are described in the following by using WCDMA terminology. It should, however, be appreciated that the following is only an example of the embodiments and thus the scope of the invention is not restricted by the use of the WCDMA terminology, and that the invention can also be applied to communication systems based on other standards.

The base station 4 of FIG. 2 includes a load control (LC) functionality 10 controlling the outer loop power control functionality 12 of the base station (OLPC/BS). The RNC 5 is shown to include a corresponding pair of a load control functionality 11 and an outer loop power control functionality (OLPC/RNC) 13. Communication paths or channels 14 and 15 are provided between the respective LC and OLPC functionalities of the BS 4 and the RNC 5. The RNC is arranged to generate an Eb/No-setpoint 16 which is subsequently transmitted to the BS in a outer loop power control command 15. In the example the command is shown to be in the form of a relative "UP" or "DOWN" command, but the OLPC command from the RNC could also include an absolute value for the targeted Eb/No-setpoint or a relative amount of increase or decrease of the setpoint value.

The OLPC/BS at the BS 4 receives the Eb/No-setpoint and may store the setpoint in an appropriate storage functionality. The Eb/No-setpoint which has been received from the RNC 5 is shown by a functionality 16 of the BS 4. For the purposes of clarity, the setpoint functionality of the base station 4 is designated correspondingly with the setpoint functionality 16 of the RNC 5.

In addition to the Eb/No-setpoint 16, the BS 4 of FIG. 2 is shown to comprise a second or further Eb/No-setpoint or a BS Eb/No-setpoint functionality 17. The arrangement is such that the second Eb/No-setpoint functionality 17 is used for controlling the closed loop power control and/or uplink fast load control functionality 18 instead of a direct use of the Eb/No-setpoint 16 received from the RNC. The first Eb/No-setpoint 16 of the BS 4 is always controlled by the RNC 5 and should always have the same setpoint value as the setpoint 16 at the RNC 5. The second EB/No-setpoint 17 is the setpoint actually provided to the closed loop functionality 18. The arrangement is such that in normal operation the second setpoint 17, i.e. OLPC/BS, follows the first setpoint, i.e. OLPC/RNC functionality 16.

When the quality of the bearer between the mobile station(s) in the cell and the base station goes bad enough the outer loop PC functionality 13 in the RNC (OLPC/RNC) 5 starts to increase the Eb/No-setpoints 16 of the radio link connection(s). An increase of the Eb/No-setpoints will eventually increase the uplink transmission powers from one or several of the mobile stations in the cell correspondingly. Similarly, a decrease of the Eb/No-setpoints would decrease the transmission powers.

According to an embodiment of the invention the Load Control (LC) algorithm 10 at the base transceiver station (BS) 4 may start preventive load control actions in order to avoid a situation in which mobile stations have to be "dropped" out i.e. disconnected from the cell. For example, the WCDMA Load Control (LC) algorithm 10 may set limit values for the BS outer loop power control parameters or freeze the base station (OLPC/BS) so that the OLPC/BS no longer follows Eb/No-setpoint increase commands by an outer loop power control 16 from the RNC 5 (OLPC/RNC).

The limiting or freezing procedure of the setpoint or target value may be initiated at the BS e.g. when a uplink total interference power level (PrxTotal) at the BS digital receiver exceeds a given threshold value. The total received wideband interference power (PrxTotal) is measured by the base station BS on cell basis for Radio Resource Indication purposes in a per se known manner. This measurement is reported periodically to the controller RNC, e.g. by using known NBAP/RADIO RESOURCE INDICATION procedure. The length of the period can be, for instance, selected from a range between 100 ms to 1 s. The RNC may then use the measurement results for functionalities such as Admission Control (AC), Load Control (LC), and Packet Scheduler (PS) and so on.

The interference power level can be estimated by the TRX unit 7 of FIG. 2. The threshold value for the interferece power is designated in the following example by PrxTargetBS. The exemplifying threshold value is defined by equation:

$$PrxTargetBS = PrxTarget + PrxOffset,$$

wherein

PrxTarget is the planned target load of the system, and

PrxOffset is the allowed marginal above PrxTarget, after which overload prevention actions are to be started.

When the total interference value PrxTotal in FIG. 2 exceeds PrxTargetBS the OLPC/BS is frozen, and the BS 4 is no longer allowed to transmit closed loop power control commands (CLPCs) towards the MS 1, even though the BS 4 may still receive OLPCs from the RNC 5. According to a more specific embodiment the outer loop PC functionality 18 in the BS (OLPC/BS) is frozen by the BS load control (BS LC) 10 after the PrxTargetBS is exceeded. In practice this means that the OLPC/BS ignores any Eb/No-setpoint increase commands of the OLPC/RNC until the PrxTotal is below the exceeded threshold.

Figure 7:
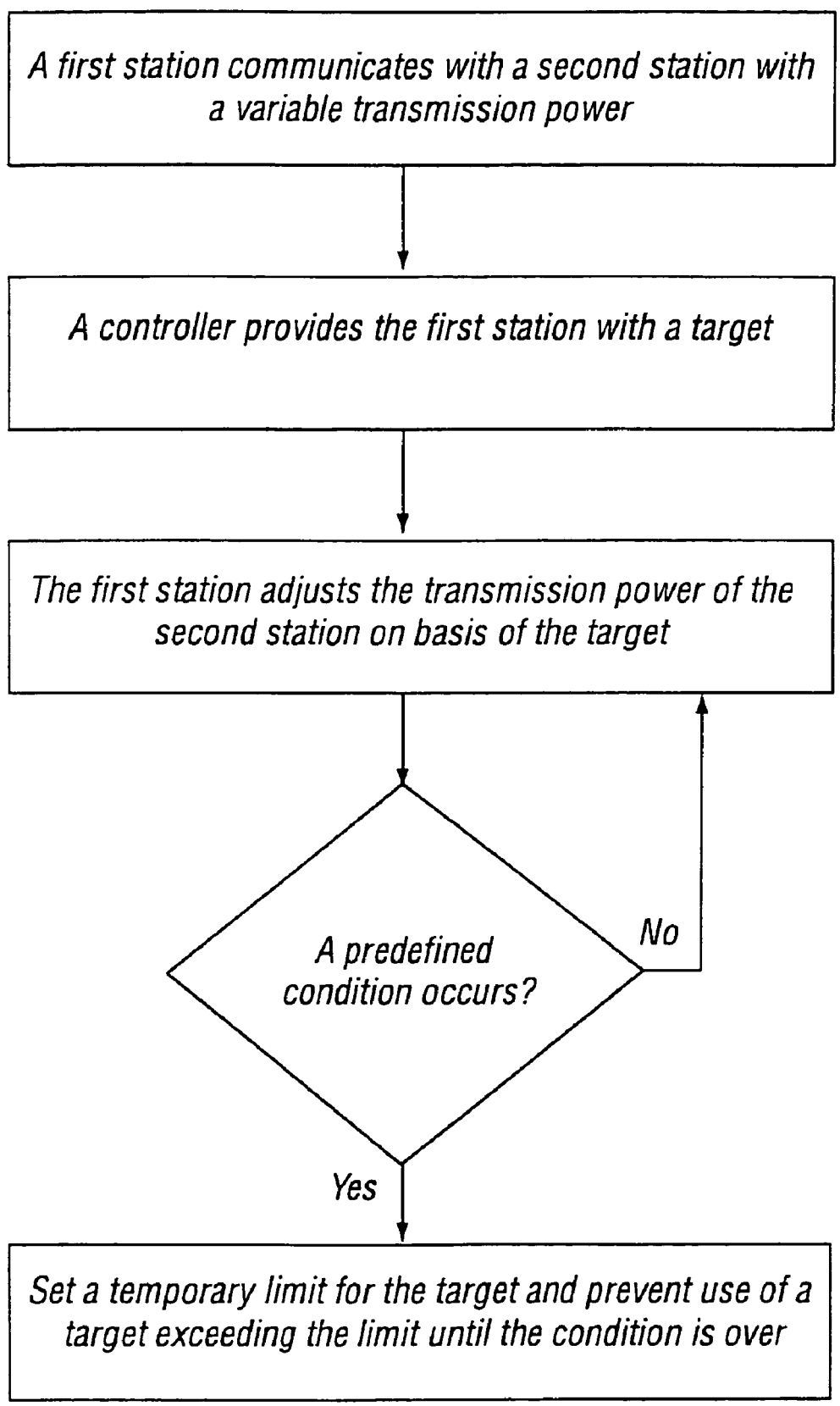
FIG. 7 is a flowchart illustrating the operation of an embodiment.

According to a preferred embodiment present in the flow chart of FIG. 7, the connection quality target value is not frozen to any precise value in a power limitation situation, but instead the target used for the connection control is prevented to exceed a certain predefined threshold value. In other words, the power control mechanism is not switched off in a power limitation situation. Instead, the connection quality target can be changed and the transmission power levels adjusted in the cell as long as the target does not exceed the temporary set upper limit.

According to one alternative only "DOWN" or "reduce target" type of commands are allowed in the closed loop while any commands aimed to increase uplink transmission powers in the cell will not become transmitted towards the mobile stations.

FIG. 2 presents in more detail the use of the PrxTotal measurement. As mentioned above, OLPC/BS is frozen or a temporary upper limit is set when PrxTotal>PrxTargetBS. In the BS the OLPC/BS can be frozen or limited on frame-bases, i.e. the determination of the PrxTotal can be accomplished over each frame. In this case the total wideband interference power received at the BS would be averaged over one radio frame (e.g. 10 ms) in the TRX-unit 7 of the BS 4, and reported periodically (e.g. every 10 ms) to the BCU unit 8 of the BS 4. PrxTotal can then be calculated on 10 ms-cycles e.g. by using sliding average window and an ALPHA-TRIMMED-MEAN filter or any other appropriate means for filtering.

The same applies to the OLPC/RNC, but it can be frozen or limited only after a radio resource (RR) indication message 14 is received in the RNC load control 11. The RR indication can be sent e.g. every 0.1 s–1 s. The outer loop PC can then be switched on/off based on monitoring of the received PrxTotal.

It is to be appreciated that the RNC 5 may alternatively receive some other type indication from the BS 4 instructing the RNC 5 to switch the OLPC/RNC on/off than the PrxTotal indication. It is also noted that the total interference value is only an example of the possible triggering parameter, and other indications of a power limitation situation can also be used for triggering the limitation or freezing procedure of the connection quality setpoint at the base station and/or the controller.

As explained, the outer loop PC of the RNC (OLPC/RNC) can be limited or frozen after the overload situation is indicated to the RNC even though this is not always necessary. For instance, the arrangement can be such that the OLPC/RNC does not carry out any Eb/No-setpoint increases, but only replaces "change" type indications with a "no change" type indication. It is also possible to arrange the OLPC/RNC such that only Eb/No-setpoint decreases are allowed. The RNC arrangement may also be such that a temporary upper limit is set for the Eb/No-setpoint allowing a normal operation of the OLPC/RNC as long as the limit is not exceeded. The limit may equal or be different to that in use in the base station. If the limit is exceeded, use of any excessive setpoint values is prevented at the RNC and thus this embodiment corresponds the use of an upper limit at the BS.

It is also possible to have the outer loop functionality frozen or limited such that all or a selected number of mobile stations communicating with the base station 4 are influenced, i.e. that the power levels of all or selected connections are cut, frozen or held below a certain limit. The connections may also be set into a priority order. In the latter instance the procedure can be such that the power levels of the lowest priority connections are limited and/or frozen first, and the highest priority connections are limited as last, if at all. The priority order classification of the connections may be based on the type of the subscription. A possibility is to use the type of the ongoing connection as basis for the prioritisation. For instance, speech, data and video connections may have different priorities. The same applies for "normal" calls, calls to emergency numbers, business calls, "hotline" calls and so on.

The OLPC/RNC freezing and/or limitation procedure may occur after the interference level or some other indication of a power limitation situation is signalled from the BS to the RNC. As explained, the RR indication message is sent periodically (e.g. in periods between 100 ms to 1s). Now, if the interference value PrxTotal exceeds PrxTargetBS (=PrxTarget+PrxOffset) as discussed above, the OLPC/RNC can be limited or frozen only after the indication of this has been received and processed at the RNC.

If the setpoint values at the BS are not allowed to follow the OLPC/RNCs from the RNC, the RNC Eb/No-setpoint 16 may start to differ from the Eb/No-setpoint 17 used by the BS for the closed loop functionality 18. This is due the fact that in most cases there will be a delay before the RNC 5 receives the overload indication 14 from the BS 4 and thus before the RNC may take similar actions to the BS. In other words, if an overload or another power limitation situation is detected, the two Eb/No-setpoints 16 and 17 of FIG. 2 start to drift because the outer loop PC generated by the RNC is no longer allowed to adjust the closed loop PC 18. This difference will be referred to in the following as drifting.

After the power limitation situation is over, the operation of the OLPC/BS and OLPC/RNC is returned to a normal mode. The Eb/No-setpoint drifting between the BS and the RNC has to be removed during the recovery after the overload situation is over (PrxTotal<PrxTargetBS) and the outer loop PC is again allowed to control the power levels. The base station can remove the drift internally because it knows the actual setpoint value 17 in at the base station 4 and also the setpoint value 16 in use at the RNC 5. Thus it is possible to set either the setpoint value 16 to equal with the actual setpoint 17 or vice versa before the operation is returned to a normal mode. In addition, history information can be used for the recovery, i.e. the setpoint values in the BS and the RNC can be returned to a value used by them before the power limitation situation was detected. It is also possible to use a default or nominal value to which the setpoint in the RNC and/or in the BS is returned at the beginning of the normal mode.

However, in order to provide a controlled recovery and to avoid any too "sharp" changes in the setpoint values, it may be preferred that the returning to the appropriate setpoint value is not done at once. This is especially the case when the quality of the connection is substantially bad. Therefore it may be preferred to use some procedure to gradually decrease the drifting.

Figure 8:
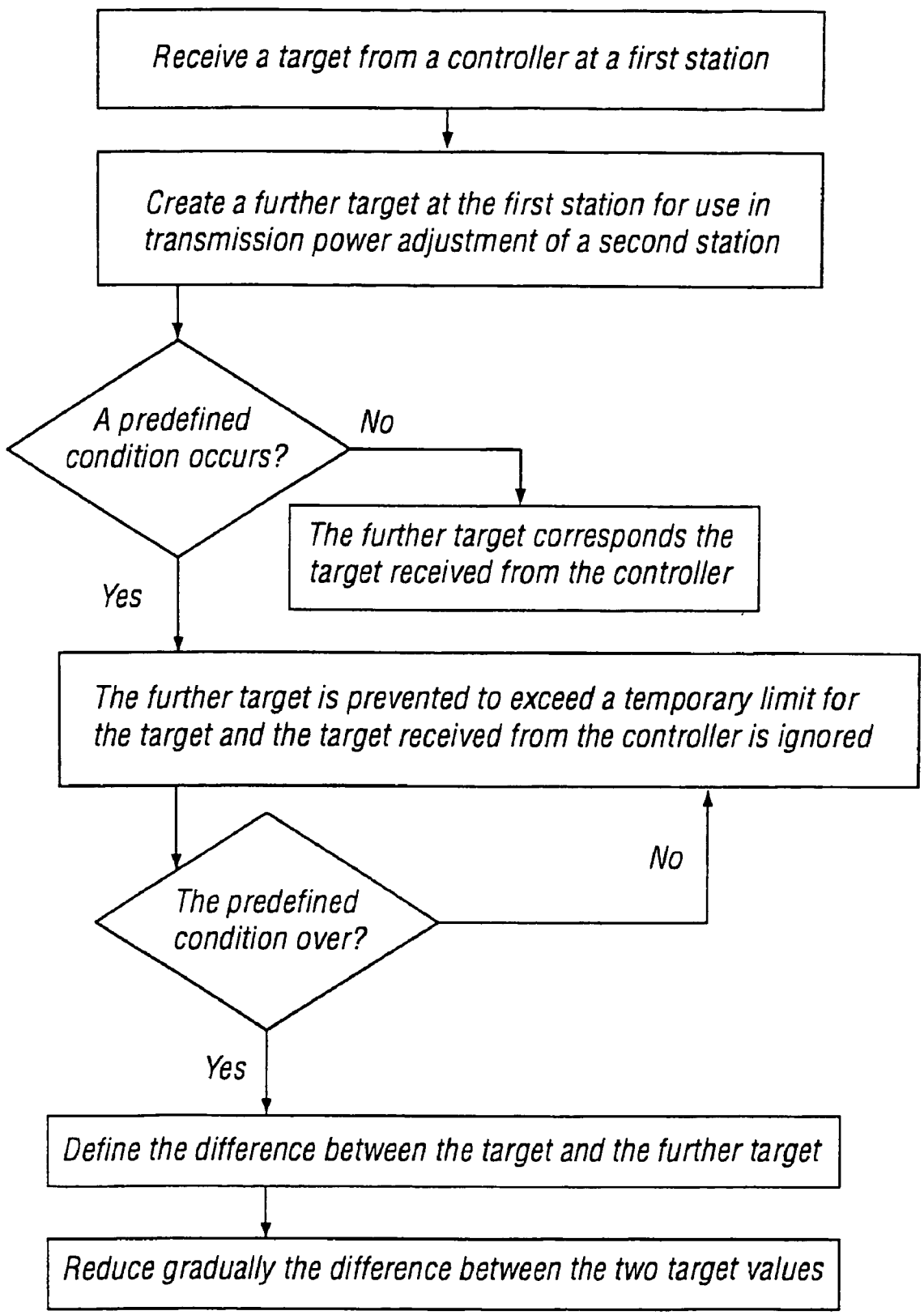
FIG. 8 is a flowchart illustrating the operation of a further embodiment.

As shown by the flow chart of FIG. 8, the BS 4 may initiate the recovery procedure by checking for a possible drift of the Eb/No-setpoints when an Eb/No-setpoint down command is received from the RNC 5. If the check is positive, i.e. an existing drift is detected, the drifting is reduced instead of the actual Eb/No-setpoint. When an Eb/No-setpoint up command is received in BS, then the actual Eb/No-setpoint is always increased if the cell is not overloaded.

Figure 3:
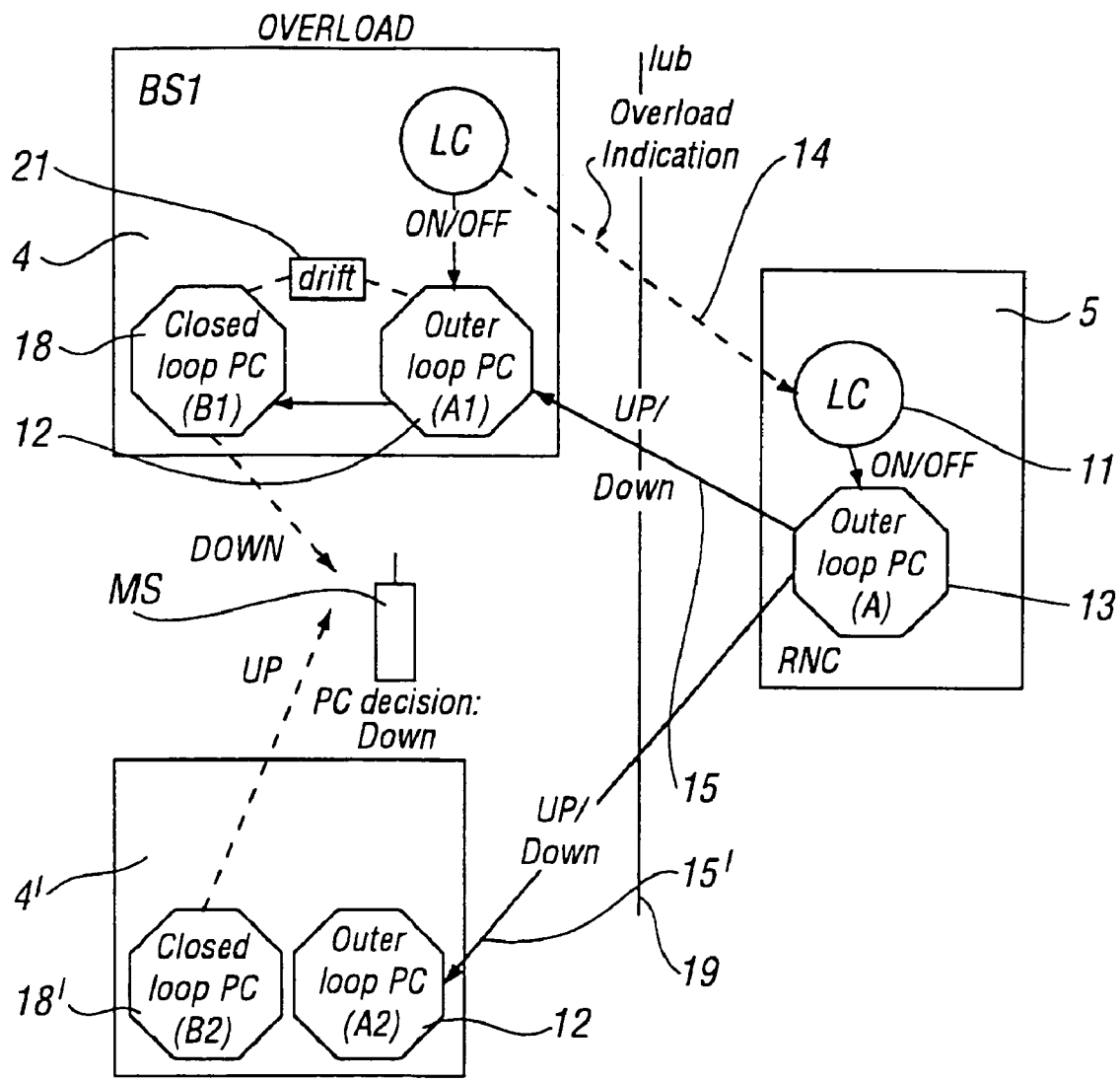
FIG. 3 illustrates schematically an embodiment of an outer loop power control mechanism in an overload situation.
Figure 4:
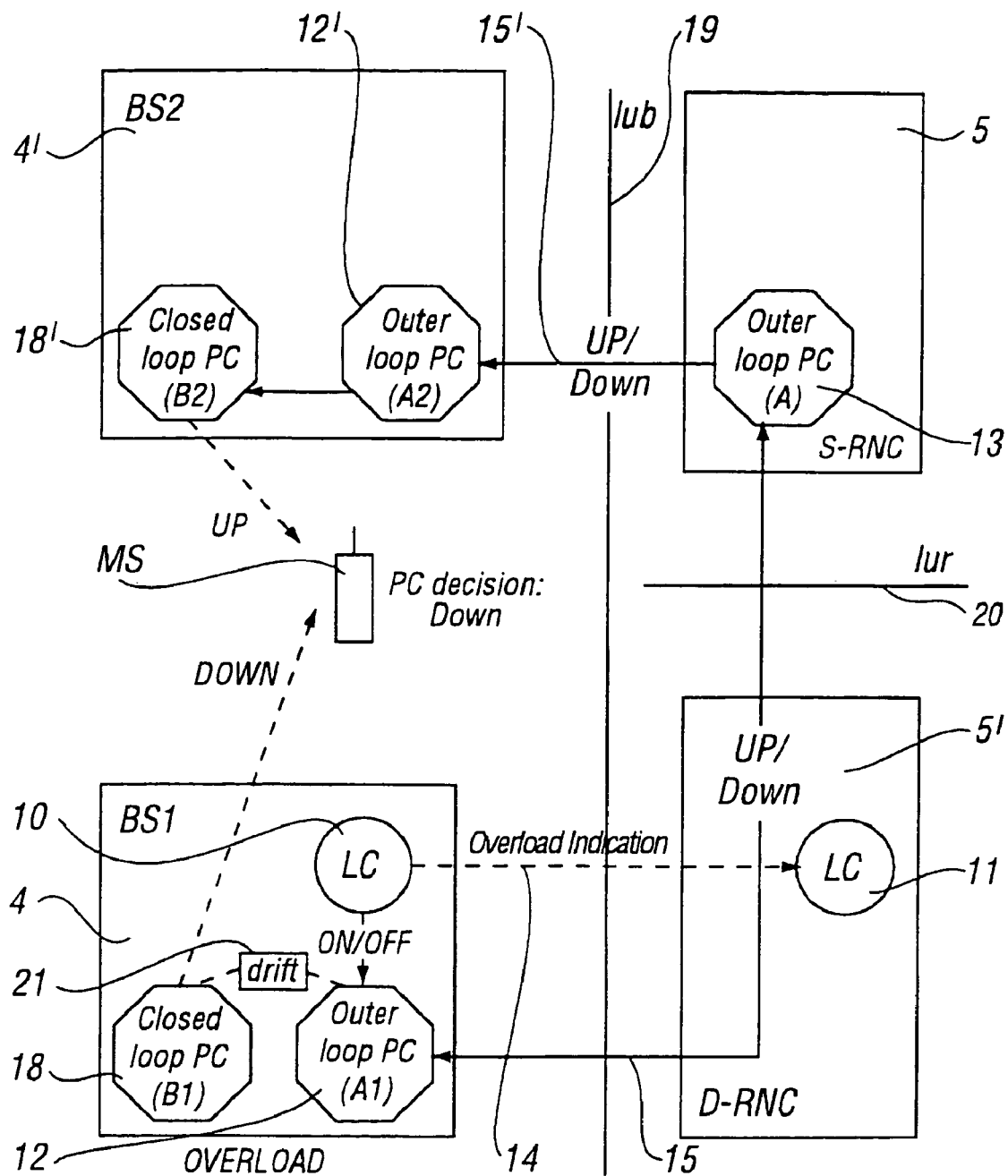
FIG. 4 illustrates schematically a further embodiment of an outer loop power control mechanism in an overload situation.

Before explaining in more detail the embodiments aimed for solving the drifting problem, the arrangements of FIGS. 3 and 4 will be briefly discussed. It is noted that even though FIGS. 3 and 4 disclose a more complex communication network arrangement than FIG. 2, the following embodiments can also be implemented in the FIG. 2 implementation.

FIG. 3 shows a situation in which a mobile station MS is controlled by two separate base stations 4 and 4' (e.g. during a handover procedure). A1 and A2 designate the first setpoints corresponding the setpoint 16 of FIG. 2 in the respective base stations. The second setpoint of the base stations is correspondingly designated by B1 and B2. The RNC 5 controls EB/No-setpoints of the base stations 4 and 4' by providing both base stations with relative outer loop power control (UP/DOWN) over an exemplifying Iub interface 19.

FIG. 4 shows an embodiment in which the mobile station is subjected to a soft handover procedure. As in the above, the outer loop PC of a radio network controller can control several Eb/No-setpoints in several BSs. However, FIG. 4 discloses the possibility that all Eb/No-setpoints in a BS are not controlled by the same controller. In this kind of situation one of the controllers is the main controller while the other controller is used for assisting in the control of the station during the handover proceedings. In FIG. 4 the main controller comprises a serving RNC(S—RNC) 5 and the assisting controller comprises a drifting RNC (D-RNC) 5'. The serving and drifting RNC are connected to each other over an exemplifying Iur interface 20. Since the overload indication has now to be transmitted from the BS1 to the serving RNC 5 over two interfaces 19 and 20 and also through the drifting RNC 5', the delay is even longer than what it would be in FIG. 2 or 3.

The serving RNC 5 of FIG. 4 controls the outer loop PC. However, the load control is performed by the load control 11 of the drifting RNC 5'. This means that in the case of a power limitation situation (overload at BS1 in FIG. 4), the outer loop PC functionality performed by the serving RNC is not interrupted, and thus the used Eb/No-setpoint (B1) and Eb/No-setpoint of RNC (A,A1) start to drift. Moreover, the Eb/No-setpoints (A2,B2) used for other handover branches can also start to increase. However, this does not cause uplink (UL) power increase as long as BS1 can control power of MS in addition to BS2. The reason for this is that the MS will not increase its transmission power as long as it receives at least one DOWN command from at least one base station.

In a normal situation A1 A2 A and B1 A1 and B2 A2 in FIGS. 3 and 4. Because of the overload at the BS1 the Eb/No-setpoints have started to drift. The controlling RNC allows the system to return to the normal PC functionality after the radio resource indication measurements have indicated that the PrxTotal is below the set PrxTargetBS. After the cell has returned back on the normal load state (PrxTotal<PrxTargetBS) the outer loop PC is allowed again to control the power levels at the BS. At this stage a drifting detection unit 21 can define the amount of the drifting.

When the normal operation of the power control functionality is allowed again, the drifting of the Eb/No-setpoints has to be reduced. Base station BS1 can remove the drift (A1<>B1, A2<>B2) internally, because it knows the actual used value (B1,B2) and also the value in use in the RNC (A1,A2). However, in order to avoid any too sharp changes in the setpoint values, a gradual Eb/No-setpoint adjustment can be accomplished. This can be done e.g. such that when an Eb/No-setpoint down command is received from the RNC 5, the BS checks drift of Eb/No-setpoints. If the check is positive the drift is reduced instead of the actual Eb/No-setpoint. When an Eb/No-setpoint up command is received in BS, then the actual Eb/No-setpoint is always increased if the cell is not overloaded.

Table 1 of FIG. 5 shows various stages of the embodiment for reducing a drift of Eb/No-setpoints between a BS and a RNC when using the following parameters.

| | |
|---|---|
| SetUp = | 0.5 dB |
| StepDown = | 0.1 dB |
| Initial Eb/No-setpoint = | 4.1 dB |

It is noted that Table 1 shows the operation of an exemplifying power control mechanism using relative adjustments. However, the herein described principles can also be applied to a power control mechanism using absolute adjustment of the power levels.

In Table 1 "A" is the Eb/No-setpoint of the RNC. "A1" and "A2" are the outer loop PC Eb/No-setpoint values of BS1 and BS2, respectively. BS1 and BS2 are both controlled by the same RNC. "B1" and "B2" are the Eb/No-setpoints used by the closed loop PC. "B1" and B2" are controlled by the outer loop PC of the BS. "OFF" means that the outer loop PC functionality is switched off. In other words, when the OLPC is in "OFF" state, the adjustment of "B1" and "B2" is not allowed in base stations regardless the commands transmitted by the OLPC. Correspondingly, adjustment of the "A1" and "A2" values is not allowed in the RNC. When the OLPC is switched "ON", this means that outer loop PC functionality is allowed again.

As explained, the OLPC/BS at the base station of the overloaded cell is frozen before the OLPC/RNC at the RNC becomes frozen and therefore an Eb/No-setpoint drifting may exist between the outer loops of the base station 4 and the radio network controller 5. Although the drifting can be eliminated by using the algorithm described above, this may not be fast enough procedure in all occasions and some further processing may be required.

For instance, the OLPC/RNC might already have been escalated/diverged, i.e. the Eb/No-setpoint of the OLPC/RNC may have raised substantially (several dBs) during the last RR indication period. This is caused partially because the RR indication period (i.e. how often the RR indications are sent) may be substantially long, wherein the OLPC/RNC will be frozen a long time (up to one RR indication period) after the OLPC/BS of the overloaded cell was frozen. The freezing of the OLPC/BS may, however, have lead into a generation of numerous frame errors (FE). The frame errors will increase the FER. The increased FER will then further unnecessarily increase the Eb/No-setpoint of the OLPC/RNC, and this will increase further the drifting between the OLPC/BS and the OLPC/RNC.

The above phenomena is one of the reasons why the normal functionality of the OLPC/RNC may not be enough right after the power limitation situation is over and the limiting or freezing of the OLPC/BS and OLPC/RNC is cancelled. The OLPC/RNC Eb/No-setpoint may have been drifted several dBs above the situation the Eb/No-setpoint was during the previous RR indication period just before the power limitation is encountered in the RNC by a new RR indication message from the BS. The OLPC/RNC drift can be defined in the following manner:

$$OLPC/RNC\ DRIFT = Eb/NO_2 - Eb/NO_1$$

where

Eb/NO$_2$ is the Eb/No-setpoint at the point when the overload situation is over and the OLPC/RNC is no longer frozen; and Eb/NO$_1$ is the last Eb/No-setpoint of a RR indication period preceding the RR indication sent from the overloaded BS.

The example presented in Table 2 of FIG. 6 will clarify further the embodiment. In Table 2 Eb/No1 is the last Eb/No-setpoint of the previous RR indication period preceeding the RR indication sent from the overloaded BS. EB/No2 is the Eb/No-setpoint at the point of time when the overload situation is over and the OLPC/RNC is no longer frozen. "A" is the Eb/No-setpoint of the RNC. "A1" and "A2" are the outer loop PC Eb/No-setpoint values of the BS, which are controlled by the RNC. "B1" and "B2" are the Eb/No-setpoints used by the closed loop PC, and are controlled by the outer loop PC of BS (OLPC/BS). "OFF" means that the outer loop PC functionality is switched off (i.e. adjusting of "B1" and "B2" is not allowed in the BS or in the case of the RNC, adjusting of "A1" and "A2" values is not allowed. "ON" means that the outer loop PC functionality is allowed to return to normal operation.

It is possible that the base station and the controller have estimated a different amount of drift to be removed, e.g. due to the different time of initiating the limitation/freezing procedures. Therefore the algorithm cab be such that after the OLPC/RNC is freed, the drift (=EbNo2−EbNo1) will be eliminated by decreasing the OLPC/RNC Eb/No-setpoint e.g. by 0.2 dB (normal decrease may be e.g. 0.1 dB) until the drift equals zero or a new Frame Error occurs. At this stage the drift elimination algorithm at the RNC is cancelled, the Eb/No-setpoint is increased by e.g. 0.5 dB and a normal OLPC/RNC action will follow. However, the OLPC/BS drifting prevention algorithm described above may still operate until the drift thereof is removed in its entirety.

It should be appreciated that whilst embodiments of the present invention have been described in relation to mobile stations, embodiments of the present invention are applicable to any other suitable type of user equipment.

The data is described as being in packet form. In alternative embodiments of the invention the data may be sent in any suitable format.

The embodiment of the present invention has been described in the context of a CDMA system. This invention is also applicable to any other access techniques including frequency division multiple access or time division multiple access as well as any hybrids thereof.

The embodiment of the invention has discussed the interaction between a radio network controller and a base station. Embodiments of the present invention can be applicable to other network elements where applicable.

It is also noted herein that while the above describes one exemplifying embodiment of the invention, there are several variations and modifications which may be made to the disclosed solution without departing from the scope of the present invention as defined in the appended claims.

What is claimed is:

1. A method in a communication system, said system comprising a controller and a first station for communication with a second station with variable transmission power over a radio connection, wherein the controller provides the first station with a target for a transmission parameter of the radio connection and the first station adjusts the transmission power of the second station on basis of the target, comprising:

monitoring for a predefined condition;

upon occurrence of the predefined condition, preventing use of a target for the transmission parameter exceeding a limit value for the target for the transmission parameters;

receiving the target for the transmission parameter from the controller at the first station; and creating a further target for the transmission parameter at the first station for use in the transmission power adjustment, wherein the further target corresponds to the target received from the controller until the predefined condition is detected whereafter the further target is prevented to exceed the limit value for the target and the target received from the controller is ignored.

2. A method according to claim 1, wherein use of a target for the transmission parameter exceeding the limit value is prevented at the first station.

3. A method according to claim 1, wherein use of a target for the transmission parameter exceeding the limit value is prevented at the controller.

4. A method according to any of the preceding claims, wherein the limit value equals with the target for the transmission parameter in use at the moment of detecting the predefined condition.

5. A method according to claim 4, wherein the target for the transmission parameter is held at the limit value until the condition is over.

6. A method according to claim 1, wherein the predefined condition comprises a temporary power limitation situation at the first station.

7. A method according to claim 1, wherein the predefined condition comprises an overload situation at the first station.

8. A method according to claim 1, wherein the predefined condition comprises a failure in the communication system.

9. A method according to claim 1, wherein the monitoring of the occurrence of the predefined condition is based on determination of the interference power of the radio connection.

10. A method in according to claim 1, wherein the target for the transmission parameter comprises connection quality target.

11. A method according to claim 1, wherein the target for the transmission parameter comprises signalling energy/noise target.

12. A method according to claim 1, wherein the target for the transmission parameter comprises a target transmission power level of the transmission from the second station.

13. A method according to claim 1, wherein the step of preventing the target for the transmission parameter to exceed the limit value comprises ignoring power control commands at the first station until the predefined condition is over.

14. A method according to claim 1, wherein the step of preventing of the target for the transmission parameter to exceed the predefined value comprises preventing a generation of new power control commands at the controller until the predefined condition is over.

15. A method according to claim 1, wherein the controller controls the transmission powers between the first station and the second station by means of outer loop power control.

16. A method in accordance with claim 1, further comprising steps of:

detecting a difference between the value of the target for the transmission parameter provided by the controller and the value of the target for the transmission parameter used for power control by the first station after the predefined condition is over; and reducing the difference between the said two target values.

17. A method according to claim 16, wherein reducing of the difference is based on history information of the target used for the power control prior the detection of the condition.

18. A method according to claim 16, wherein the step of reducing the difference comprises changing the value of the target provided by the controller to equal values of the target used by the first station for controlling the transmission power at the moment the condition is detected to be over.

19. A method according to claim 16, wherein the difference between the said two target values is reduced gradually.

20. A method according to claim 19, wherein the gradual reducing of the difference comprises steps of;
  ignoring a request from the controller to reduce the transmission power until the difference between the target values used by the first station and provided by the controller is below a predefined level; and
  subtracting a predefined amount from the difference as response to said request.

21. A method according to claim 20, wherein the predefined amount corresponds the requested decrease of the transmission power.

22. A method according to claim 19, wherein the gradual reducing of the difference comprises requesting a decrease of the transmission power by an amount that is greater than the amount of decrease requested in a normal mode of operation until the difference between the target values used by the first station and provided by the controller is below a predefined level.

23. A method according to claim 1, wherein the transmission power control is based on use of relative power control requests.

24. A method according to claim 1, wherein the communication system comprises a further station similar to the first station and the controller controls the transmission power of the second station by providing both the first and the further station with targets for the transmission parameter.

25. A method according to claim 1, wherein connections between the first station and other stations are adjusted in a priority order.

26. A method according to claim 1, wherein the controller comprises a radio network controller of a cellular communication system, the first station comprises a base station of the cellular communication system and the second station comprises a mobile station, and wherein the transmission power to be adjusted comprises transmission power from at least one mobile station towards at least one base station.

27. A communication system comprising:
  a controller arranged to control transmission power of stations;
  a first station and a second station capable of providing a communication path therebetween, wherein the controller is arranged to provide the first station with a target for use in control of the transmission power of the second station;
  monitoring means for monitoring for a predefined condition; and
  means for preventing use of a target for the transmission parameter exceeding a limit value for the target for the transmission parameter upon occurrence of the predefined condition,
  the first station comprising a first target functionality for receiving the target from the controller and a further target functionality for generating a further target for the transmission parameter, wherein the arrangement is such that the further target is used for the power control of the second station and corresponds to the target provided by the controller unless the predefined condition is detected whereafter the further target is set such that the limit value for the target for the transmission parameter is not exceeded.

28. A communication system according to claim 27, further comprising detecting means for detecting a difference between the target and the further target and recovery means for reducing the difference after the predefined condition is over.

29. A communication system according to claim 28, wherein the recovery means are arranged to reduce the difference gradually.

30. A communication system according to claim 27, wherein the controller comprises a radio network controller of a cellular communication system, the first station comprises a base station of the cellular communication system and the second station comprises a mobile station, and wherein the transmission power to be adjusted comprises transmission power from at least one mobile station towards at least one base station.

31. A station of a communication system, said station controlling transmission power of a further station transmitting towards the station, wherein the station is arranged to:
  receive a target for a transmission parameter provided by a controller of the communications system for use in the control of transmission power of the further station;
  monitor for a predefined condition; and
  upon occurrence of the predefined condition, to prevent use of targets for the transmission parameter exceeding a limit value for the target for the transmission parameter,
  said station further comprising a first target functionality for receiving the target for the transmission parameter provided by the controller and a further target functionality for generating a further target for the transmission parameter, wherein the arrangement is such that the further target is used for the power control of the further station and corresponds to the target received from the controller unless the predefined condition is detected whereafter the further target is set by the further target functionality such that the limit value for the target is not exceeded.

32. A station according to claim 31, further comprising detecting means for detecting a difference between the target and the further target and recovery means for reducing the difference after the predefined condition is over.

33. A station according to claim 32, wherein the recovery means are arranged to reduce the difference gradually.

* * * * *